US006876627B1

United States Patent
Rao

(10) Patent No.: US 6,876,627 B1
(45) Date of Patent: Apr. 5, 2005

(54) RAINCHECK ON VOICE OVER PACKET NETWORK CALLING

(75) Inventor: Anup V. Rao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 776 days.

(21) Appl. No.: 09/607,570

(22) Filed: Jun. 29, 2000

(51) Int. Cl.$^7$ .............................................. G01R 31/08
(52) U.S. Cl. ...................................... 370/230; 370/353
(58) Field of Search ............................... 370/238, 238.1, 370/237, 229, 230, 236, 236.1, 351–4, 395.2, 395.21, 401, 466, 469, 395.1, 395.52, 395.61, 395.6, 395.65

(56) References Cited

U.S. PATENT DOCUMENTS

| | | | | |
|---|---|---|---|---|
| 5,635,980 A | * | 6/1997 | Lin et al. ...................... | 725/131 |
| 5,903,559 A | * | 5/1999 | Acharya et al. ............ | 370/355 |
| 6,134,235 A | * | 10/2000 | Goldman et al. ........... | 370/352 |
| 6,144,670 A | * | 11/2000 | Sponaugle et al. ......... | 370/401 |
| 6,253,249 B1 | * | 6/2001 | Belzile ........................ | 709/249 |
| 6,282,192 B1 | * | 8/2001 | Murphy et al. ............. | 370/352 |
| 6,337,858 B1 | * | 1/2002 | Petty et al. ................. | 370/356 |
| 6,347,091 B1 | * | 2/2002 | Wallentin et al. ........... | 370/437 |
| 6,360,271 B1 | * | 3/2002 | Schuster et al. ............ | 709/231 |
| 6,714,536 B1 | * | 3/2004 | Dowling ...................... | 370/356 |

* cited by examiner

Primary Examiner—David Vincent
(74) Attorney, Agent, or Firm—Marger Johnson & McCollom P.C.

(57) ABSTRACT

A method of placing a voice call over a packet network. The method includes presenting a user with a selection between a more expensive public switched transmission network call to be placed immediately and a taking a rain check for a less expensive packet network call. If the user selects the packet network call, a network device automatically attempts the packet network call, such that the user does not have to remain connected by the call. The network device could reserve resources to complete the call. Additionally, the user could select an interval time for which the repeated attempts are to be made, as well as whether to fall back to PSTN if the time expires before resources become available.

15 Claims, 2 Drawing Sheets

RAINCHECK ON VOICE OVER PACKET NETWORK CALLING

BACKGROUND

1. Field

This disclosure relates to voice over packet network calling, more particularly to a method to allow users to select less expensive voice over packet network calling at a later time or a more expensive public switched transmission network immediately.

2. Background

Packet voice networks allow owners of data networks to use those data networks to place long-distance calls and avoid the typical long-distance tariffs. The data network may have access to the Internet or a proprietary network through an access provider, for which a flat fee is paid. Typically there is no fee associated with the amount of traffic generated by terminals on the network. Large networks commonly have enough excess capacity that information other than data can be transmitted with no further charges being levied.

One type of such data is voice data. In a traditional phone call, the caller and recipient speak to each other through a public switched transmission network (PSTN). In this network, the caller identifies the recipient by dialing a number and a direct link is established between the two parties. Voice signals travel this link with almost no delay, typically providing good quality signals on both ends.

In a packet voice network, the voice signal is coded into digital form and possibly compressed. Compression allows more data to be packed into fewer bits, resulting in fewer packets being created. After the voice data is coded, it is packetized into packets for the given network type and transmitted as if it were data. At the receiving end, the packets are reassembled and converted back to voice signals. Each packet can travel a different path, and may actually arrive at the destination out of order. The system orders them and decodes them to produce the voice signal of the caller.

One major concern in packet networks is quality of service (QoS). The direct links of a PSTN service offer high quality transmission with little or no delay. Packet voice networks need to provide similar quality to achieve acceptance. However, several factors can contribute to degradation of voice transmissions on packet networks.

The process of coding and decoding the packets can cause delay of two types. The first type is related to the transmission delay of the packets. This may disrupt the rhythm of the conversation to the point when the caller and recipient are talking out of turn because one or the other did not receive the voice signals in enough time to avoid talking over the other. The second type of delay, referred to as jitter, is a disruption of the pattern of speech. Speech has a distinct rhythm in which pauses can have as much meaning as words. Jitter disrupts this rhythm and can further degrade the quality of service.

In either case, part of the problem lies in the network delays in getting packets to their destination in a timely manner. The main obstacle to timely delivery is network congestion. If the network devices, such as routers and servers, have queues of packets waiting to be sent, and the connections are running at maximum bandwidth, delays will occur in packet networks. This will lead to delays in transmitting and receiving voice packets, degrading the QoS of the packet voice network. Another problem is that some packets are lost during their transit of the network. These lost packets further degrade the QoS of packet voice networks.

However, using a packet voice network has the advantage of being far less expensive than PSTN. This makes the use of packet voice desirable. One solution that has developed in several companies is to try the packet voice network first. If the parameters of the packet voice network are not within those needed to achieve a voice call with high QoS, the system typically switches to a PSTN fallback link, if one is configured. While this will allow a large percentage of the attempted voice over packet network calls to be completed, a significant number of them will be rejected due to network congestion.

Network congestion can clear up in a relatively short time, depending upon the speed of the network devices and the bandwidth available. The ability to make the call over the less expensive voice network may be missed by a few seconds because of the fallback process. It would be more efficient if a technique were available that allowed the packet network to be tested repeatedly and the call completed using the packet network when bandwidth becomes available and can be guaranteed.

SUMMARY

One embodiment of the present invention is a method of placing a voice call over a packet network. The method includes presenting a user with a selection between a more expensive public switched transmission network call to be placed immediately and a taking a rain check for a less expensive packet network call. If the user selects the packet network call, a network device automatically repeats the attempt to place the packet network call, such that the user does not have to remain connected by the call. The network device could reserve resources to complete the call. Additionally, the user could select an interval time for which the repeated attempts are to be made, as well as whether to fall back to PSTN if the time expires before resources become available.

Another aspect of the invention is a network device operable to allow a user to take a rain check on a voice over packet network call. The network device includes a communication device for receiving the call request, placing the call request on the network, receiving input signals indicating a level of congestion on the network and a to connect the caller and destination if the call is successful. The network device also includes a processor for automatically and repeatedly attempting to complete the call.

BRIEF DESCRIPTION OF THE DRAWINGS

The invention may be best understood by reading the detailed description with reference to the drawing(s), wherein.

DETAILED DESCRIPTION OF THE EMBODIMENTS

Figure 1:
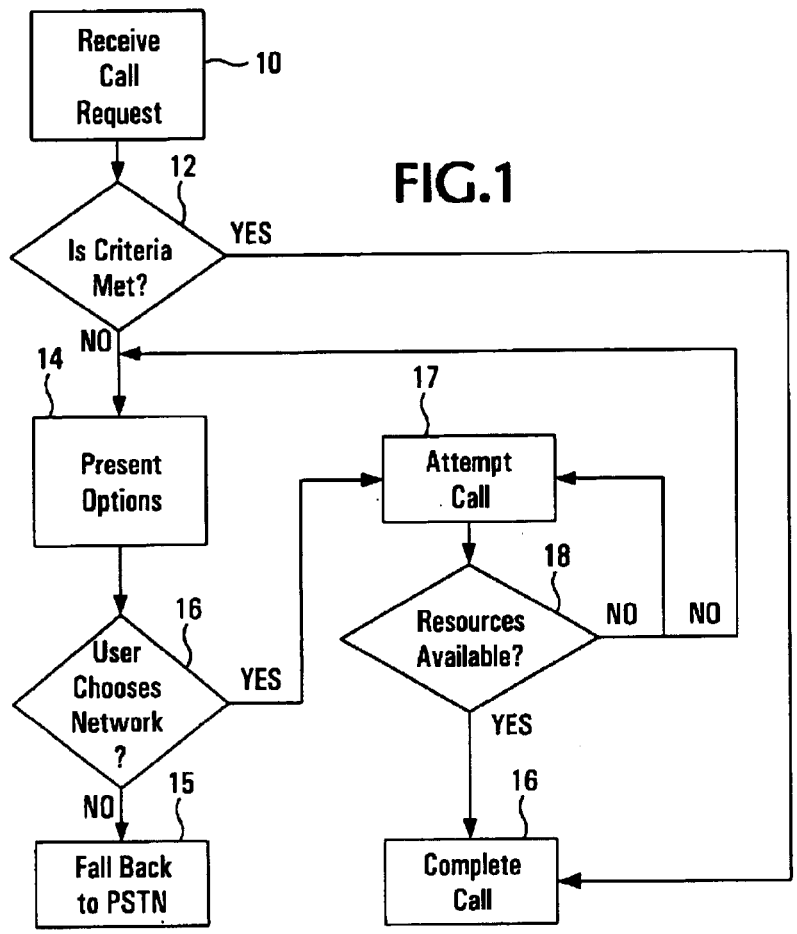
FIG. 1 shows an embodiment of a network device operable to repeatedly attempt a voice over packet network call, in accordance with the invention.

The ability to place calls over packet networks provides users with a less expensive alternative than public switched transmission networks (PSTN). However, because the voice signal is coded and packetized, any delays can degrade the quality of service (QoS) for the phone call. In order to be a viable alternative, packet networks need to achieve a similar quality for packet network calls.

As mentioned previously, several factors contribute to the delay. The time taken to code and packetize the voice data can cause delays. The characteristics of the delay depend upon the type of coder/decoder (codec). Different codecs comply with different coding standards. One coding standard, referred to as G.711, for example, codes voice with 8000 samples per second, 8 bits per sample, using pulse code modulation (PCM). The bandwidth needed for codecs using this standard is 8000×8 bits, or 64,000 (64K) bits per second (bps).

Other standards use different methods of coding with or without compression. Examples include G.726, which uses adaptive PCM at 40, 32, 24 and 16 Kbps, and G.729, which uses adaptive code-excited linear predictive voice compression at 8 Kbps. Typically, more coding and compression complexity will result in longer delays during the coding process, but will result in lower bandwidth requirements. The criteria, or bandwidth necessary, of a certain call will depend in large part on the type of codec being used to place the call.

Network congestion contributes the most delay to packet voice transmission. The congestion typically arises from a lack of bandwidth. Too many resources try to send too much data across network pathways that do not have the capacity to handle it all. Packets are held up as network devices transmit across low bandwidth pathways, taking longer than planned. The receiving end does not receive the packets quickly enough to avoid degradation of the QoS. The delayed packets may result in disruption of the conversational rhythm as well as awkward pauses and breaks in speech pattern referred to as jitter. The delay causes the network to fail when given call criteria that requires more bandwidth than is available.

Several ways of detecting congestion and avoiding it, or seizing network resources to guarantee a given bandwidth, are available in packet networks. The term 'packet network,' as mentioned above, refers to networks that packetize information and route it across the network regardless if the information is voice, video or data. Three examples of such networks will be discussed here as examples, but any packet network with analogous mechanisms would benefit from application of the invention.

The three types of packet networks used as examples are Internet Protocol (IP), Asynchronous Transfer Mode (ATM), and Frame Relay (FR). Each of them can be used to send voice data in a packet format. The term 'packet' as used here will include IP packets, ATM cells and FR frames. Each of these networks has congestion measurements and mechanisms available to ensure quality of service. The mechanism in each type of network to ensure QoS will be referred to as resource reservation. For purposes of discussion, the example of Internet Protocol (IP) networks and Voice over IP (VoIP) will be used as an example for application of the invention.

A flowchart of one embodiment of a method to place VoIP calls in shown in FIG. 1. The user dials into a VoIP gateway, typically through a two-stage dialing application. The first stage requires the number of the gateway, and the second stage requires the final destination number. The gateway, or other network device, receives the request at 10. The network device then uses admission criteria to complete the call, if the resources are available to meet the criteria at 12. In order to guarantee good quality, two methods are typically used to determine resource availability.

A first method to determine if the resources are available uses congestion measurements. These measurements monitor the network by various means and report back to the sending network device as to the availability of bandwidth and any delays in the network. An example of this type of measurement in IP networks is IPPM, Internet Protocol Performance Measurement. IPPM sends a one-way message to a destination. The message directs the destination network device to return the time the message-carrying packet arrived.

Other types of methods are also used, including PSTN fallback and trunk conditioning measurements used in some network operating systems, such as Cisco's Internet Operating System (IOS). In this type of measurement, periodic probes are sent out from sending network devices and delay measurements are taken. These measurements provide information on network congestion.

In FR networks, similar mechanisms exist. Two such examples are Backward Explicit Congestion Notification and Forward Explicit Congestion Notification (BECN and FECN, respectively). These notifications are sent in the form of a bit on the frame header that is set to indicate congestion. In FECN, the bit is sent as the frame travels forward. In BECN, when a frame encounters congestion between a sender and receiver, the receiver sets the bit on frames returning to the sender. In ATM networks, an analogous mechanism is found in Connection Admission Control (CAC), which monitors congestion on the network. ATM uses CAC to control the admission of cells into the network to avoid or manage congestion.

These congestion measurements and monitoring techniques can provide the network device attempting to place a call with an indication of the probable success of failure of the call. If congestion is indicated that does not allow the call to be placed with the desired criteria, the network device will fail the attempt at 12.

Another method to decide whether a call attempt succeeds or fails is to attempt to reserve resources that comply with the call criteria. In IP networks, a protocol referred to as resource reservation protocol (RSVP) allows a sending device to force or seize the resources necessary to route packets along a certain path. The network device attempting the call would send RSVP path messages to the destination number. The receiving application would receive the path message and would send appropriate reservation request messages specifying the desired data flow descriptors. After the sending device receives a reservation request message from the destination, it can complete the call. In FIG. 1, if RSVP is used at 12 and the reservation request messages are received, the call can be completed at 19. However, if the network device does not receive these messages, the call attempt will fail.

In FR and ATM networks, there is no real need for resource reservation, because these networks typically offer a network-guaranteed level or delay or jitter. Either the bandwidth is available or not. In ATM networks the network device would have to ensure that the class of service for the call is guaranteed-service, which provides known bandwidth for the call. Typically, these networks will fail or succeed with a call using congestion measurements. However, if resource reservation were used in these networks, it would offer another method to determine if call criteria can be met.

In the embodiment of FIG. 1, if the call attempt fails at 12, the network device presents the user with options at 14. The options would be to place the call on the packet network for a relatively low price, but at a later time, or to place the call for a higher price immediately. If the user chooses to place a network call, the network device would launch an automatic call attempting process at 17.

If the resources are not available, one of two alternatives may occur, depending upon system configuration. If the resources are not available, the system could be set up to either continue to repeatedly try until the resources become available. In this process, the call is completed at 19 if the resources are available. Alternatively, the system could offer the user the same choice at 12, but with the added information that the resources are not currently available to place the packet voice network call. These alternatives could be selected by the system administrator, or the user, either as a preference for all calls or on a call-by-call basis.

If the user chooses not to use the network call at 16, the system would fall back to the more expensive PSTN system at 15 and place the call immediately. As will be discussed further, another option would be for the network call attempt to be made for a certain amount of time and if it is not completed during that time the system automatically falls back to PSTN. If fall back to PSTN occurs, the call will be completed at 19 with only one call being placed.

Call completion through the network at 19 will typically involve placing two calls from the network device. The network device would call the user to notify the user that the call was finally successful, as well as completing the call to the destination number. If resource reservation is used, especially with RSVP in an IP network, the destination number call is actually tried during the attempts because RSVP must be synchronized with call signaling. Therefore, that call may be actually completed first.

In traditional phone service private branch exchanges (PBXs), a feature similar to this may be available, referred to as "camp-on." If a caller dials an extension in the PBX and that extension is busy, the caller can dial a sequence of numbers and special characters that causes the calling phone to 'camp-on' the dialed extension until that extension becomes free. Once the user makes the selection to camp-on, the decision to complete the call is based only on the extension becoming free, rather than a choice based upon the quality of service. In application of the invention, the decision to complete the call is based upon a choice with to regard to the quality of service. Additionally, the user dynamically selects the quality of service itself, rather than 'configured and forgotten' based upon a network administrator's choice.

Figure 2:
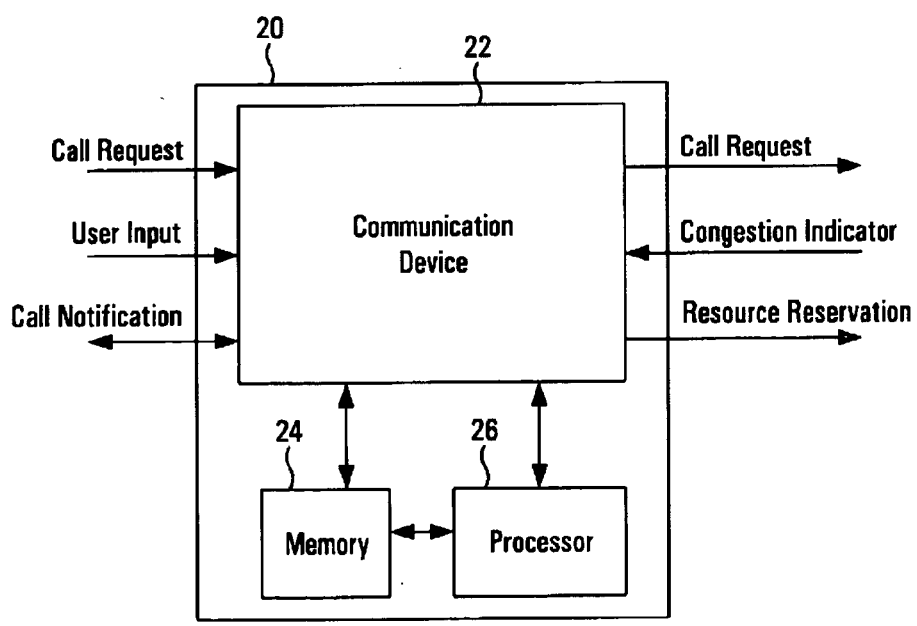
FIG. 2 shows a flowchart of an embodiment of a method to repeatedly attempt a voice over packet network call, in accordance with the invention.

A network device 20 in accordance with the invention is shown in FIG. 2. The network device includes a communications device 22 that manages communications between the calling user and the destination number, including monitoring the network environment. The communication device 20 may include some type of storage or memory 24 that will store the destination number, call criteria, neither or both. It may also include a processor or controller, referred to here as a processor 26, for processing signals received by the communication device 22, as well as automatically launching the repeated call attempts.

The communication device receives input signals, shown here as different input lines, but may actually all be on one line between the calling station and the network device. The line may be across a local-area network or wide-area network and provides communication between the calling station and the network device, although it may not be a direct line.

The input signals would include the call request that starts the process. As mentioned before when the call request is received by the network device, the network device will attempt to complete the call with an output call request signal. If the congestion indicator input signal indicates that the call request will fail, the call notification bi-directional communication between the caller and the network device allows the network device to present the caller with the options. The user input signal is then used to either launch the automatically repeating call requests or to fall back to PSTN.

If resource reservation is used, the resource reservation signals are output from the communication device. As mentioned before, if the resource reservation is RSVP over an IP network, the resource reservation signal and the call request signal will be synchronized.

The network device as shown in FIG. 2 may be a stand-alone device or may be part of another device. Additionally, the memory, processor and communications device may all be on one integrated circuit, or various other configurations may be possible. The invention may be implemented as an upgrade to the software of existing devices. If the invention were embodied in software, it would be distributed in a computer-readable form. The definition of computer-readable includes the network device as a computer. It would typically be distributed as a downloadable file sent across the network to the device, or an uploadable image file from another computer connected to the network device, or some other format, such as compact disc or floppy diskette.

Figure 3:
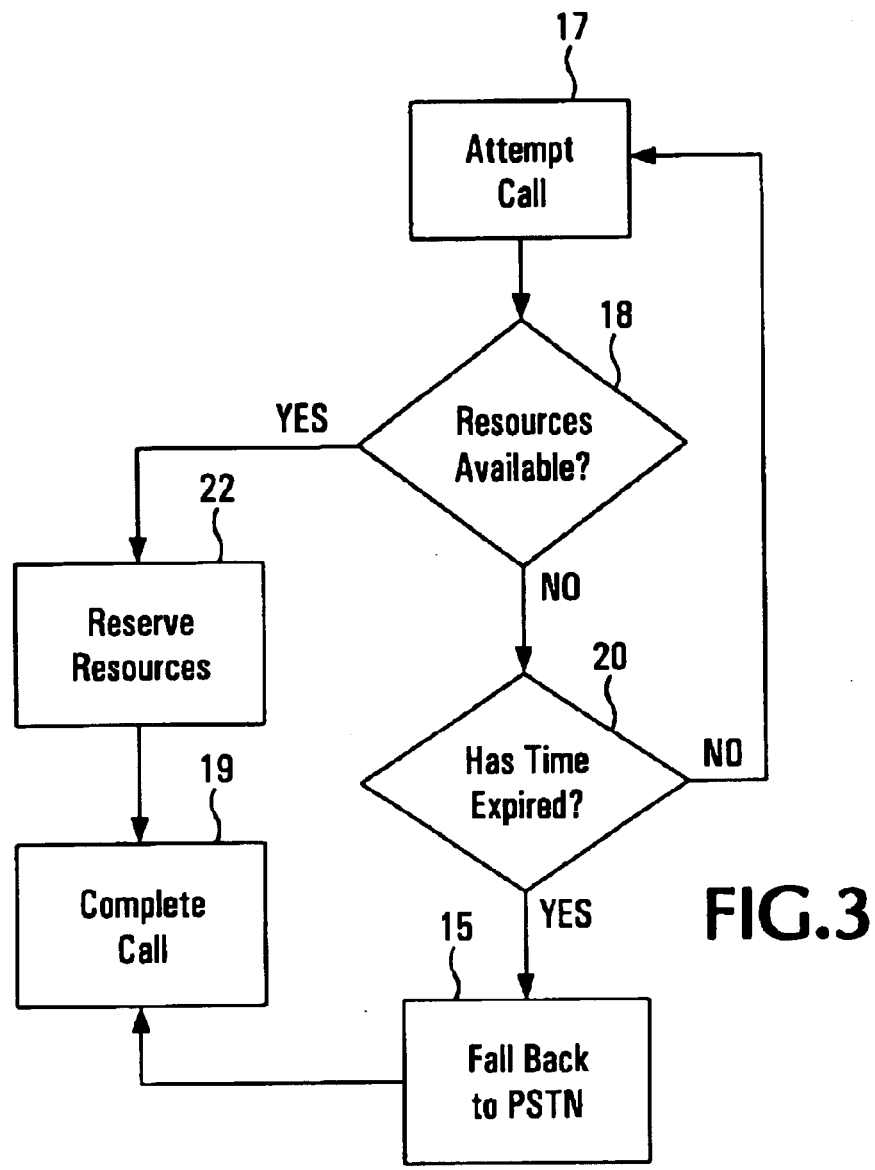
FIG. 3 shows a detailed flowchart of an embodiment of a method to repeatedly attempt a voice over packet network including resource reservation, in accordance with the invention.

Once implemented, application of the invention would allow the user to select the quality and cost of desired service by taking a rain check for the packet network call. A more detailed flowchart of a method for automatic repeated call attempts across a network is shown in FIG. 3. The call is attempted at 17, just as in FIG. 2. The resource reservation determination at 18 is expanded to include reserving resources at 22 prior to completing the call at 19. As mentioned previously, this is optional. In addition, another option is shown in FIG. 3.

In addition to the user selection of placing the call over the packet network made in FIG. 1, the user could be allowed to tailor the interval of time for which the repeated attempts will be made. This time may expire before the resources become available. If the time has expired at 20, the system would fall back to PSTN at 15, similar to FIG. 1, and the call will be completed at 19. An alternative would be to also allow the user to select whether to fall back after the timer expires or to allow the call to fail completely. Complete failure would terminate the repeated attempts and would not fall back to PSTN.

As can be seen, several options in implementing the invention are available. The user could select to place the call across the network, the time for which the attempts should be made and whether to fall back to PSTN. Alternatively, the user could just be afforded the choice of the packet network or PSTN. Application of the invention allows the user to dynamically control the call and the quality of service rather than being forced to accept choices made by a system administrator when the network was installed.

Thus, although there has been described to this point a particular embodiment for a method and structure for rainchecks for packet network calls, it is not intended that such specific references be considered as limitations upon the scope of this invention except in-so-far as set forth in the following claims.

What is claimed is:

1. A method of placing a voice call over a packet network, the method comprising:

presenting a user an option to select between a more expensive public switched transmission network call to be placed immediately and a less expensive packet network call to be placed at a time later than the public switched transmission network call, wherein the option is presented prior to attempting the call;

receiving an input signal from the user selecting the packet network call;

automatically attempting the packet network call, such that the user does not have to remain connected by the call without attempting the public switched network call; and abandoning the packet network call if an interval of time expires prior to call completion.

2. The method of claim 1 wherein the user designates an interval of time in which the packet network call is to be attempted.

3. The method of claim 1 wherein the method further comprises notifying the user and a called party to the call and completing the call.

4. The method of claim 1 wherein attempting the packet network call further comprises using resource reservation to ensure sufficient bandwidth for call completion.

5. The method of claim 4 wherein the resource reservation further comprises resource reservation protocol on an IP network.

6. The method of claim 4 wherein the resource reservation further comprises guaranteed bandwidth on an asynchronous transfer mode network.

7. The method of claim 4 wherein the resource reservation further comprises setting of a minimum information rate for the call in a frame relay network.

8. A computer-readable medium containing software, the software further comprising:

code operable to present a user interface to a caller allowing a user to select between an immediate more expensive public switched transmission network call and a packet voice network call to be place at a time later than the public switched transmission network call;

code operable to receive an input from the caller selecting a packet voice call, prior to attempting a call;

code operable to automatically attempt to complete the packet voice call repeatedly without attempting the public switched transmission network call; and code operable to abandon the packet voice call after an interval of time has expired prior to call completion.

9. The computer-readable medium of claim 8, wherein the medium further comprises a downloadable file.

10. The computer-readable medium of claim 8, wherein the medium further comprises an image file.

11. A network device operable to repeatedly attempt a voice over packet network device, comprising:

a communication device operable to receive a call request from a caller and present a user interface to a user with options between an immediate public switched transmission network call and a voice over packet network call placed at a time later than the public switched transmission network call, wherein the options are presented prior to attempting a call; and a processor operable to:
automatically attempt the voice over packet network call repeatedly during an interval of time, the interval of time depending upon the user input; and
to abandon the voice over packet network call if the interval of time expires prior to call completion.

12. The network device of claim 11, wherein the network is an Internet Protocol network.

13. The network device of claim 11, wherein the network is a Frame Relay network.

14. The network device of claim 11, wherein the network is an Asynchronous Transfer Mode network.

15. A network device operable to repeatedly attempt a voice over packet network call, comprising:

means for receiving an incoming call and presenting a caller with a user interface offering a choice between an immediate public switched transmission network call and a voice over packet network call to be placed at a time later than the public switched transmission network call, wherein the choice is offered prior to attempting the call;

means for receiving an input signal from the user selecting to place a call over a packet network; and means for:
automatically attempting a voice over packet network call repeatedly during an interval of time, depending upon a user input generated from the user interface; and abandoning the voice over packet network call if the interval of time expires prior to call completion.

* * * * *